May 5, 1942.  R. T. CLOUD  2,281,751
SEISMIC WAVE GENERATION APPARATUS
Filed Nov. 10, 1939  2 Sheets-Sheet 1

Inventor:
Raymond T. Cloud
By Geo. L. Parkhurst
Attorney.

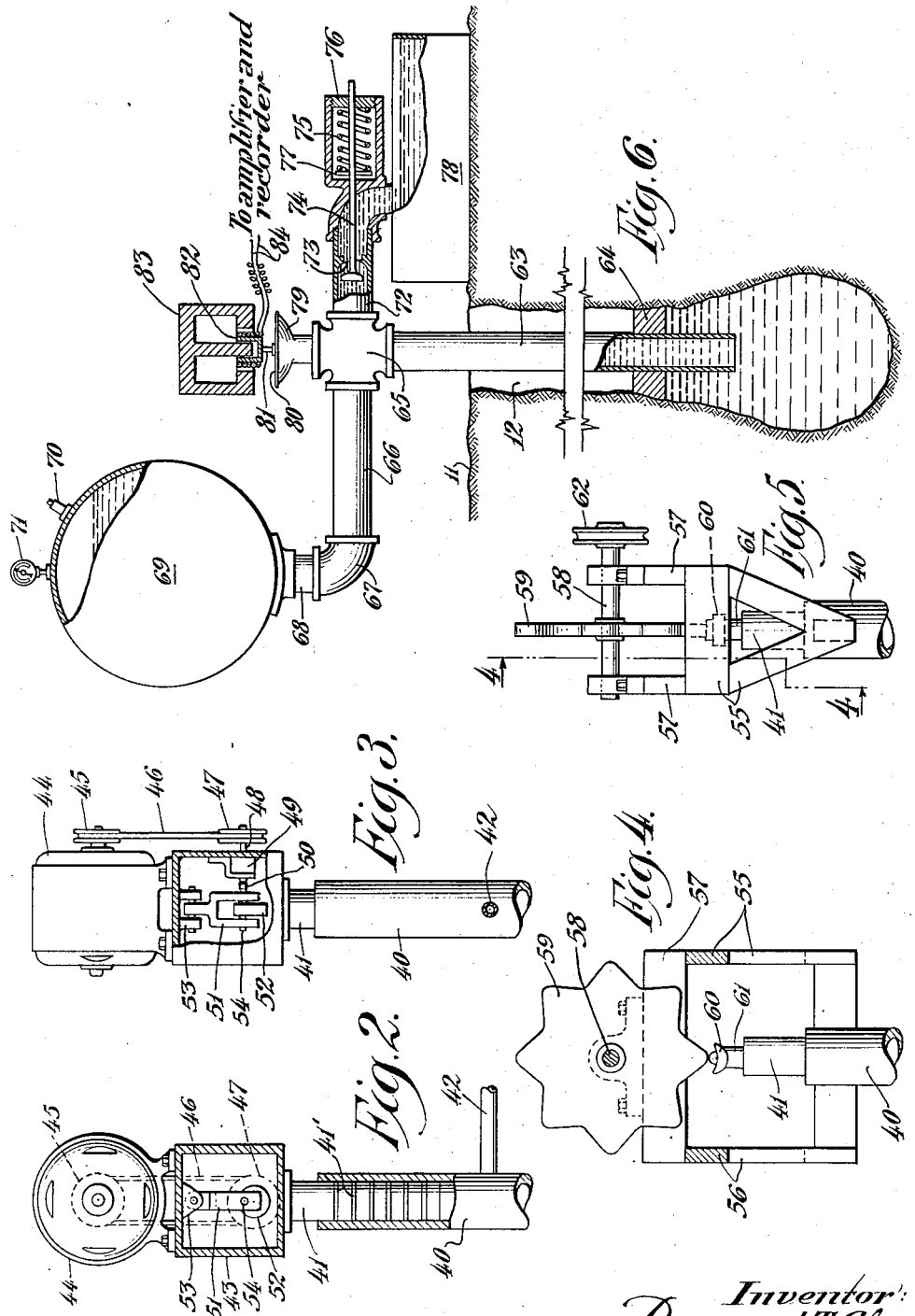

Patented May 5, 1942

2,281,751

UNITED STATES PATENT OFFICE 2,281,751

SEISMIC WAVE GENERATION APPARATUS

Raymond T. Cloud, Tulsa, Okla., assignor to Stanolind Oil and Gas Company, Tulsa, Okla., a corporation of Delaware Application November 10, 1939, Serial No. 303,825

18 Claims. (Cl. 181—0.5)

This invention pertains to the art of seismic geophysical prospecting and more particularly pertains to that branch of this art which deals with the generation of artificial seismic waves.

One little known branch of the art of seismic geophysical prospecting deals with the generation and detection of what, for lack of a better name, have been referred to as steady state seismic waves. In this type of prospecting a source of seismic waves is used which is characterized by the fact that numerous pulses of seismic energy are generated in certain timed relationship to each other, each one of which radiates out from the source so that at any point in the vicinity of the source there is repeated motion over a considerable period of time. This differs sharply from the procedure more often used, of generating one sharp pulse or a series of very rapidly decaying pulses of seismic energy by detonation of dynamite, or the like.

It is a well known fact that seismic waves impinging on interfaces between two strata of differing elastic properties or densities will experience refraction and reflection at each interface.

Several ways have already been disclosed in the art whereby an oscillating seismic wave source of constant frequency, or of varying frequency, can be utilized in the determination of the presence of such interfaces, due to the presence of the refracted and reflected waves. For example, it is possible to study the interference patterns set up at the surface of the earth due to the presence of these refracted and reflected waves, or it is possible to determine the apparent direction of the resultant of all the waves at varying positions on the earth's surface. Still other methods have been discussed.

The principal difficulty in practicing any of these methods has been the difficulty of obtaining a satisfactory source of seismic waves of a recurrent or periodic nature.

One attempt to get around this difficulty has been by the successive detonation of a number of charges of dynamite placed in roughly the same locality, but this is not by any means sufficient when one wishes to set up a continuous source of waves. Another disadvantage is that it is impossible by this method to obtain substantially a point source of vibration. Unbalanced fly wheels and combinations of unbalanced fly wheels which are rotated upon a platform attached to the ground have been used, but this type of system is not entirely satisfactory because of the inefficiency of the energy transfer from the fly wheel and support to the ground on which it is resting, due to inherently poor mechanical coupling between them. Another disadvantage of this type of system is that only relatively low frequencies can be produced in this manner. Finally it is difficult to generate a sufficient amount of power to operate except in the vicinity of the source.

This specification discloses a new type of source of continuous seismic waves which is compact, easily transportable and capable of generating either low or high frequencies. By the use of this new source it is easy to obtain a marked increase in energy transfer from the source to the surrounding medium as compared with the systems previously known.

Accordingly it is an object of this invention to provide an apparatus for imparting to the earth a periodically varying stress, so that a continuous train of seismic waves can be produced.

It is a further object of this invention to provide means by which the source frequency of the artificially generated seismic waves may be altered at will over a wide range of frequency.

Another object of my invention is to provide means whereby the transfer of energy from the source to the ground in the form of steady state seismic waves will be facilitated and hence will be more efficient than was previously possible.

A further object of my invention is to provide apparatus for imparting a periodically recurring stress to the ground below the surface and at whatever depth is desired.

It is a further object of my invention to provide means for initiating steady state seismic waves in such manner that they radiate from a substantially point source.

Yet another object of my invention is to provide an apparatus for imparting a cyclically varying stress to the ground so that the variation in stress will be of an optional wave shape.

It is a further object of my invention to generate steady state vibrations in the earth by means of an apparatus which is compact and can be easily transported from point to point during the course of the prospecting.

Further objects and advantages of my invention will be realized upon perusal of this specification and of the drawings which form a part of the specification and are to be read in conjunction therewith.

In these drawings:

Figures 2 and 3 are diagrammatic elevations, taken at right angles to each other with parts broken away, showing a modified surface apparatus which can be used instead of that shown in Figure 1;

Figure 4 is a sectional elevation taken along the line 4—4 of Figure 5;

Figure 5 is a diagrammatic elevation of another type of surface apparatus which can be used in accordance with my invention; and Figure 6 shows in diagrammatic form a cross-section of a portion of the earth's crust and an elevation, with parts broken away, of another arrangement of apparatus in accordance with my invention, for imparting cyclical seismic vibrations to the earth.

Figure 1:
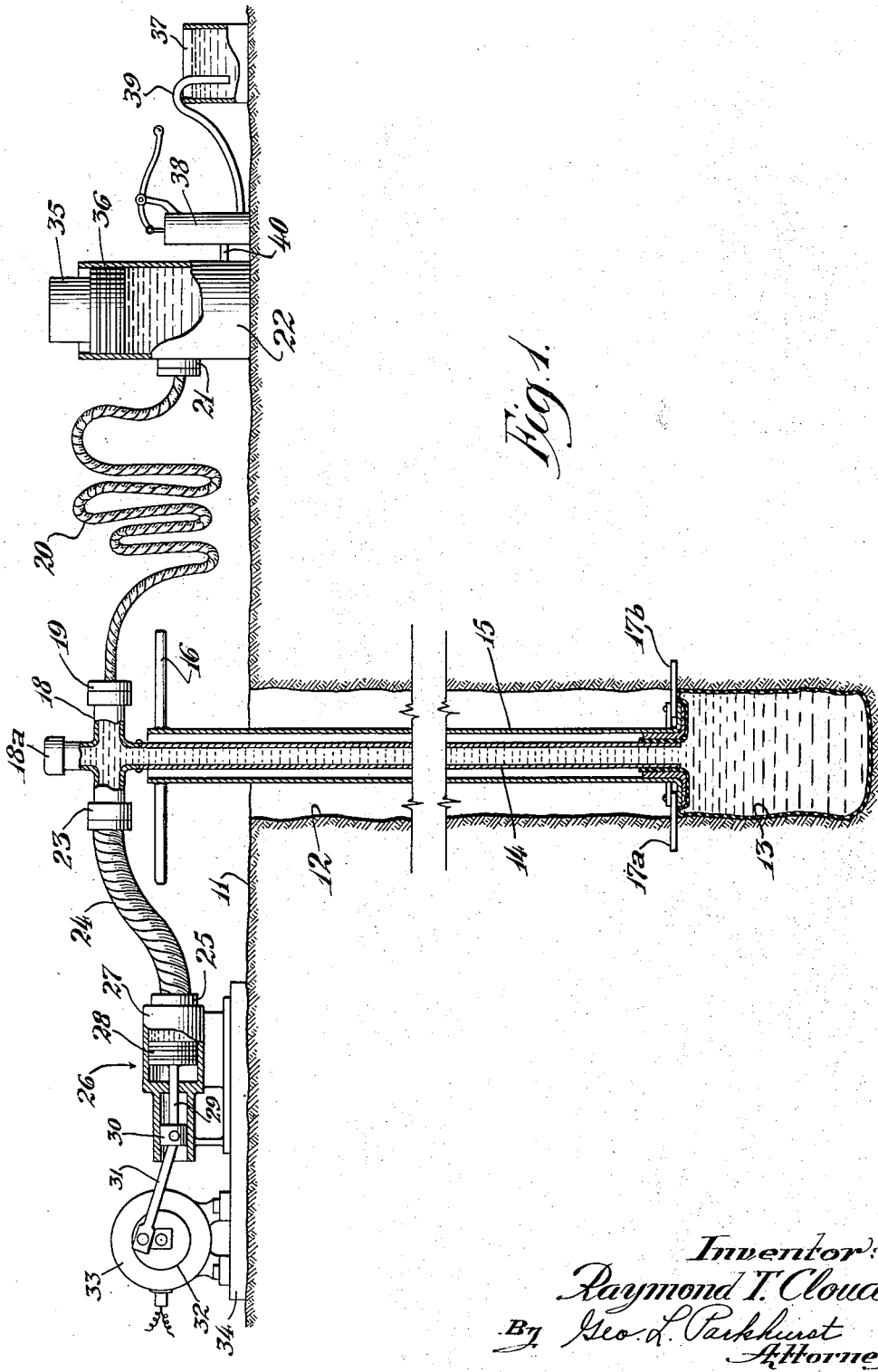
Figure 1 shows in diagrammatic form a cross-section of a portion of the earth's crust and an elevation, with parts broken away, of one form of apparatus according to my invention for imparting cyclical seismic vibrations to the earth.

In general I impart cyclical variations in stress to a small region in the earth, whereby steady state seismic waves are produced, by digging a cavity in the earth, constraining a body of water therein which is connected hydraulically to a water supply at the surface, and varying the hydraulic head in a cyclic manner whereby the stress in the body of the water will vary periodically, thus varying the stress on the earth walls of the well against which the hydraulic pressure is exerted. This elementary description of the apparatus and its use can be more easily understood by reference to Figure 1.

Referring now to Figure 1 which shows one embodiment of my invention, the surface of the ground 11 has been pierced by a well 12 to any desired depth. Preferably this depth is a few feet below the water table but this is not always a necessary requirement.

Into this well is lowered a flexible bag 13 at the end of tube 14. Bag 13 is so designed and constructed that when full of water its walls will press tightly against those of the well, and it may be constructed of rubber, Thiokol, Duprene or other rubber substitute, or synthetic rubber-like material, rubberized canvas, or any other material which possesses sufficient flexibility to satisfy the above requirements.

I prefer to anchor the bag in place at the bottom of the hole, which may be accomplished by means of pipe 15, handles 16, and anchors 17a and 17b, any desired number of which can be used. In the design of this particular embodiment of the invention, pipe 15 is flared at the bottom and to this flare are attached a number of pivoted arms which are sharpened at the other extremity and are of such a length that when the pipe is rotated after insertion in the hole they will catch on the walls of well 12 and by further rotation of pipe 15, will be driven into the formation as shown in Figure 1. This will anchor bag 13 securely in place.

Tube 14 is connected at the top to a cross 18 of which one side goes through coupling 19, hose 20, and coupling 21 to standpipe 22, while the other arm goes through coupling 23, hose 24 and coupling 25 to reciprocating pump 26. The third arm of the cross can be advantageously capped by cap 18a which can be removed in order to inspect the interior of tube 14, bag 13, etc.

Reciprocating pump 26 is composed of a cylinder 27 in which fits a piston 28, preferably fitted with piston rings to insure a close fit, piston rod 29 and cross head 30 to which is attached connecting rod 31, which is in turn connected to fly wheel 32 of prime mover 33, the prime mover and pump proper being attached securely to base 34. In this illustration prime mover 33 is shown as an electric motor, but it may be a gasoline engine or any other source of power which will suitably drive piston 28.

Standpipe 22 contains weight 35 resting on piston 36 which forms a relatively water-tight seal with the inner wall of standpipe 22. Water is supplied to the standpipe 22 from some source or container shown generally as 37, by means of a pump 38 and intake and outlet lines 39 and 40 respectively.

In operation, bag 13, tube 14, and the surface water lines are filled with water by pumping the water from source 37 through pump 38 into standpipe 22. This imposes a static head of water upon bag 13 equal to the depth of the bag below the surface plus the pressure due to the weight 35 resting on the surface of the water in standpipe 22. This pressure must be sufficient to hold the walls of bag 13 tightly against the walls of well 12. It has been found occasionally advantageous to increase the mechanical coupling between bag 13 and well 12 by partially filling well 12 with water after the bag is in place. The apparatus is at this point ready to generate seismic waves.

Prime mover 33 is then started up. It reciprocates piston 28 in cylinder 27 which causes an approximately sinusoidal variation in pressure to be imparted to the water in hose 24 which communicates it through tube 14 to bag 13, which in turn communicates it to the surrounding media and there sets up seismic waves whose source frequency is determined by the speed of the pump 26, and whose amplitude depends upon the maximum and minimum pressures due to this pump. In order that the pressure changes in cylinder 27 will affect the general static pressure only to a negligible degree, it is preferable that connection 20 be of small cross section and be coiled upon itself so that it presents a high impedance to the flow of liquid. This, coupled with the inertia of weight 35 and piston 36, tends to produce the desired condition in the system which is that there should be as far as possible a total absorption of the pump energy by the walls surrounding the confined liquid in bag 13.

It may be seen from this description that I have accomplished the major purpose of this invention by applying to a localized area of the walls of well 12, a cyclically varying stress which sets up cyclically varying seismic waves for whatever length of time is desired. It is also obvious that by controlling the speed of the pump 26 I can control the source frequency of the seismic waves produced. If it is desired to vary the amplitude of the waves produced, this can be done by either varying in any of a number of ways known to the art the length of the pump stroke, or by inserting a regulating valve in line 24.

At the end of the surveying operation prime mover 33 is shut down, the water is pumped out of the system, handle 16 is rotated in the opposite direction releasing the anchors such as 17a and 17b from the walls of the well, couplings 19 and 23 are disconnected and the apparatus is removed from the well ready for the move to the next location.

Figure 1 shows this invention in an extremely elementary form, for better understanding of the principles involved. In actual operation many changes may be made. For example, the surface equipment with the exception of the hose, will usually be mounted in a truck and instead of a weighted standpipe 22, other hydraulic means well known in the art can be used to obtain a sufficient static head on the bag. Quite often it is unnecessary to use the anchoring mechanism shown, in which case it is usually preferable to fill the hole partly with water after the insertion of the bag. It is also unnecessary that the static hydraulic system be coupled to the head of tube 14 as it may equally well be coupled directly to cylinder 27, which arrangement has the advantage of being more compact and more readily portable.

It has been found that it is highly advantageous to apply stress to the earth below the so-called "weathered layer" which in normal cases can be loosely defined as terminating at the edge of the water table or a few feet below. Stress applied above this point does not impart anywhere near as much energy in the form of seismic waves as can be obtained below this point. By use of the apparatus shown herein, it is possible to apply the varying stress necessary for steady state seismic surveying below the weathered layer, thus securing the advantages of efficient energy transfer to the ground.

There are a number of various arrangements of apparatus which will satisfy the requirements set forth in the objects of this invention. For example, a very compact setup is shown in diagrammatic form in Figures 2 and 3.

In Figure 2, tube 40 replaces tube 14 of Figure 1. In its upper end is fitted a piston 41 which is free to slide vertically inside the tube. This piston can advantageously be machined with a number of small grooves 41' for fluid packing which help prevent leakage of the liquid from around the top of the tube. Below the piston is fitted a pipe 42 which is connected to a source of water in such manner that water can be forced into tube 40 so that a suitable static head can be built up at the lower end. The weight of the piston and the equipment above it will, of course, increase this head and may be the chief contributor to it. Thus this arrangement will replace the weighted standpipe 22 of Figure 1.

The mechanism for imparting the cyclical change in pressure to the water immediately below the piston 41 includes a frame 43 on which is mounted motor 44, which drives through pulleys 45 and 47 and belt 46, shaft 48 which is journaled in a bearing mounted in a bracket 49. Shaft 48 is connected to a flexible shaft 50 which may suitably be rubber and which connects with another metal shaft 54 which is journaled in fork 51. On this shaft 54 is mounted eccentrically a mass 52. The fork 51 is in turn mounted as a pendulum between two supports 53 by means of a loose fitting pin driven through all three. Care is taken that shaft 54 passes through the center of percussion of the fork.

It will be seen from this description that when motor 44 is turned on, shaft 54 will be rotated, which will rotate eccentric 52, which will produce an unbalanced force which will be essentially vertical.

This force varies as the square of the velocity of the rotating mass which can be driven at varying frequencies by changing the speed of motor 44. This apparatus furnishes a simple means to obtain both the static pressure desired and the cyclical variation in pressure necessary to produce the steady state seismic waves. As stated above the periodic force produced upon the piston and hence upon the bag filling the base of the well, is proportional to the square of the angular velocity of the rotating mass and hence is proportional to the square of the frequency. Accordingly large forces will be produced at high frequencies, offsetting the attenuation of the earth medium which increases in general with an increase in frequency.

Figures 4 and 5 show a modification of the device of Figures 2 and 3 and illustrate a way by which periodic pressures of arbitrary wave shapes can be generated and impressed on the liquid at the bottom of the hole and hence to the earth. In these figures tube 40 has welded to it at the top two supporting members 55 and 56 which support cross members 57. Journaled on these cross members is shaft 58 bearing a cam wheel 59. This shaft carries, fixed to it, a pulley 62 similar to pulley 47 of Figure 3, which can be driven by a motor or similar device as in Figures 2 and 3.

Piston 41 in this case, is not attached to the frame work but carries at its end a follower bearing 60, mounted on extension 61 of the piston. In operation, water is admitted below the piston until the follower bearing is pushed up into contact with cam wheel 59 with whatever pressure is desired. The wheel is then revolved at the speed desired. It is obvious that there must be sufficient resilience in the rubber bag or in the water supply system connected to pipe 42, so that piston 41 can move up and down over whatever range is determined by the original cutting of the cam. The variation of pressure with time will be determined by the shape of the cam and hence can be made any arbitrary wave shape which the follower bearing can follow.

Another advantage of this last named setup is that it is possible to generate high frequency waves with relatively low pulley speeds, for example, in the arrangement shown, the frequency impressed upon the water in tube 40 will be eight times that obtained using the apparatus shown in Figure 2 with the same pulley speed.

Figure 6 shows another possible modification for obtaining cyclical pressure variations in a confined liquid in a hole, in this case by utilizing the water hammer which occurs upon suddenly stopping the flow of a column of liquid. In this modification it is assumed that the hole used was previously used for explosives as in normal seismic prospecting, so that the bottom of it is blown out to a larger diameter than the rest of the hole, roughly as shown in Figure 6. This enlargement while desirable is not necessary. An under-reamed hole can also be used. Such enlargements can, of course, be used with any of the apparatus shown in Figures 1 through 5 as well as with that of Figure 6.

Referring to Figure 6 in more detail, a pipe 63 is lowered into bore hole 12 and a packer 64 (shown diagrammatically) of any desired type, is set so that when water is poured into pipe 63 it will be confined in the bottom of the hole. The top of pipe 63 is connected through cross 65, pipe 66, elbow 67 and nipple 68 to tank 69, which is filled with water to some arbitrary point after which, if the hydrostatic head in the bottom of the well is insufficient, air can be admitted to the tank through valve 70 until a sufficient pressure is built up for the purpose desired. This pressure is indicated on gage 71. The opposite arm of the cross is connected to pipe 72 containing an annular constriction 73 and a piston 74. This piston is spring loaded by spring 75 which is normally compressed between backing member 76 and pin 77 which is fixed in the piston rod, so that there is a tendency for the piston not to seat in the constriction. Until ready for operation this is overcome by pulling back on the piston rod. There is an opening behind the constriction in pipe 72 which will allow any water getting by the constriction to flow into tank 78.

The top of the T is closed by closure member 79, across the top of which is stretched the water-tight diaphragm 80, the purposes of which will be discussed later. The action of this device is as follows:

As soon as the piston rod is released, piston 74 moves away from constriction 73 and allows water to flow into tank 78. The velocity of the stream flowing past the piston tends to move it back against the constriction, shutting off the flow and allowing spring 75 to act. Consequently there will be a series of closings and openings of the piston against the constriction which will produce a fairly constant frequency water hammer. This water hammer is transmitted by the water in cross 65 and pipe 63 to that confined in the bottom of the well and from thence to the formation immediately surrounding this water, in the form of seismic waves. The frequency of the source can be adjusted by the use of springs of various strengths and various water pressures in tank 69.

It is occasionally advantageous to know, with a reasonable degree of accuracy, the instant at which each seismic wave is generated. Figure 6 shows one possible method of determining this quantity. Diaphragm 80 communicates directly with the water in the system which is experiencing a cyclical variation in pressure and accordingly vibrates. This vibration is transmitted by member 81 to a coil and bobbin assembly 82 which is similar to the voice coil of a dynamic loud speaker. This coil fits into the radial air gap of a magnet assembly 83 which is similar to any of the magnet assemblies used in dynamic loud speakers. It is held in position relative to the cross 65 by braces (not shown) so that as diaphragm 80 vibrates in response to the water hammer, coil 82 vibrates vertically in synchronism with this water hammer and a voltage is built up across leads 84 of the coil, again in direct synchronism with the water hammer. These leads can be attached to an amplifier and seismic recorder or can be made use of in any manner known in the art.

By means of this apparatus it is possible to generate electric waves substantially simultaneously with the steady state seismic waves generated in the earth. This apparatus can be utilized with any of the previous arrangements for imparting cyclical variations of pressure to the confined liquid in the hole, by connecting member 79 to any point in the system at which these pressure variations are obtained.

When one constant source frequency is used throughout the area to be surveyed, it is advantageous to place the confined liquid by means of which the pulsating pressure is applied to the earth, one-half wave length, or an odd multiple of half wave lengths, below the surface of the ground so that the reflected wave from the surface will reinforce the wave radiated by the confined liquid.

Instead of water, aqueous solutions, for instance antifreeze solutions, drilling muds, oils, for instance oils used in hydraulic brakes and hydraulic transmissions, organic solvents, glycerine, etc. may be used. Air or other gas can also be used in suitable apparatus although liquids are much to be preferred.

It is obvious that there are many changes and modifications in the types of apparatus which can be used and it is to be understood that the invention is limited only by the scope of the appended claims.

I claim:

1. Apparatus for generating seismic waves for use in geophysical prospecting comprising a localized body of fluid substantially completely confined beneath the surface of the earth, a conduit enclosing a fluid column communicating with said localized body of fluid and extending therefrom upwardly to a point above the surface of the earth, said localized body of fluid being in intimate pressure responsive relationship with the earth surrounding said body, said fluid column being relatively free from pressure responsive relationship with the earth surrounding said column, and means for applying pressure stresses to the upper part of said fluid column for transmission through said fluid column to said localized body of fluid and thence to the earth surrounding said localized body of fluid.

2. Apparatus for generating seismic waves for use in geophysical prospecting comprising a localized body of fluid substantially completely confined beneath the surface of the earth with a portion of the earth in pressure responsive relationship to said body of fluid, a conduit enclosing a fluid column, said fluid column being free from substantial pressure responsive relationship to the earth surrounding it, said conduit and said fluid column extending from said localized body of fluid to a point above the surface of the earth, and means for applying pressure stresses to the upper part of said fluid column.

3. Apparatus for generating seismic waves for use in geophysical prospecting comprising a localized body of liquid substantially completely confined beneath the surface of the earth with a portion of the earth in pressure responsive relationship to said body of liquid, a conduit enclosing a liquid column, said liquid column being free from substantial pressure responsive relationship to the earth surrounding it, said conduit and said liquid column extending from said localized body of liquid to a point above the surface of the earth, and means for applying pressure stresses to the upper part of said liquid column.

4. Apparatus for generating seismic waves for use in geophysical prospecting comprising a localized body of fluid substantially completely confined beneath the surface of the earth with a portion of the earth in intimate pressure responsive relationship therewith, a conduit enclosing a fluid column, said fluid column being out of substantial pressure responsive relationship to the earth surrounding it, said conduit and said fluid column extending from said localized body of fluid to a point above the surface of the earth, and means for continuously applying continuously varying stresses to said fluid column and maintaining said stresses for any desired period of time, whereby said stresses are transmitted through said fluid column to said confined body of fluid and thence to the portion of the earth in pressure relationship therewith, but not in substantial measure to the earth surrounding said conduit.

5. Apparatus for generating seismic waves for use in geophysical prospecting comprising a localized body of liquid substantially completely confined beneath the surface of the earth with a portion of the earth in intimate pressure responsive relationship therewith, a conduit enclosing a liquid column, said liquid column being out of substantial pressure responsive relationship to the earth surrounding it, said conduit and said liquid column extending from said localized body of liquid to a point above the surface of the earth, and means for continuously applying continuously varying stresses to said liquid column and maintaining said stresses for any desired period of time, whereby said stresses are transmitted through said liquid column to said confined body of liquid and thence to the portion of the earth in pressure relationship therewith, but not in substantial measure to the earth surrounding said conduit.

6. Apparatus according to claim 5 in which said body of liquid is located beneath the weathered layer of the earth.

7. Apparatus for generating seismic waves for use in geophysical prospecting comprising a localized body of fluid substantially completely confined beneath the surface of the earth, a conduit enclosing a fluid column communicating with said localized body of fluid and extending therefrom upwardly to a point above the surface of the earth, said localized body of fluid being in intimate pressure responsive relationship with the earth surrounding said body, said conduit being relatively free from pressure responsive relationship with the earth surrounding said column, and means for continuously applying and maintaining, for any desired period of time, continuously varying stresses of definite frequency to the upper part of said fluid column for transmission to said localized body of fluid, said localized body of fluid being located a distance below the surface of the earth approximately equal to an odd multiple of one half the wave length of seismic waves of said frequency.

8. Apparatus for generating seismic waves for use in geophysical prospecting comprising a flexible bag disposed in a bore hole in the earth and in contact with the walls of said bore hole, a body of fluid within said bag, a conduit enclosing a fluid column communicating with said body of fluid and extending therefrom upwardly to a point above the surface of the earth, said body of fluid being in intimate pressure responsive relationship with the walls of said bore hole with which said flexible bag is in contact, said fluid column being relatively free from pressure responsive relationship with the earth surrounding said fluid column, and means for applying pressure stresses to the upper part of said fluid column for transmission through said fluid column to said body of fluid and thence through said bag to the walls of said bore hole with which said bag is in contact.

9. Apparatus for generating seismic waves for use in geophysical prospecting comprising a flexible bag disposed in a bore hole in the earth and in contact with the walls of said bore hole, a body of liquid within said bag, a conduit enclosing a liquid column communicating with said body of liquid and extending therefrom upwardly to a point above the surface of the earth, said body of liquid being in intimate pressure responsive relationship with the walls of said bore hole with which said flexible bag is in contact, said liquid column being relatively free from pressure responsive relationship with the earth surrounding said column, and means for applying and maintaining continuously varying stresses to the upper part of said liquid column and maintaining said continuously varying stresses for any desired period of time for transmission through said liquid column to said body of liquid and thence through said bag to the walls of said bore hole with which said bag is in contact.

10. Apparatus for generating seismic waves for use in seismic geophysical prospecting comprising means defining a bore hole in the earth, fluid-tight means for isolating a portion of said bore hole, a pipe passing through said fluid-tight means with its lower end in fluid communication with said portion of said bore hole and its upper end extending above the surface of the earth, a body of liquid filling said portion of said bore hole and said pipe and means located above the surface of the earth for applying periodic stresses to said liquid.

11. Apparatus for generating seismic waves for use in seismic geophysical prospecting comprising a flexible bag anchored in place in a bore hole in the earth and in contact with the walls of said bore hole, a body of liquid within said bag, a conduit enclosing a liquid column in communication with said body of liquid and extending up through said bore hole to a point above the surface of the earth and means for applying periodic stresses to said liquid column, thence to the body of liquid within said bag and thence to the walls of said bore hole.

12. Apparatus for generating seismic waves for use in seismic geophysical prospecting comprising a body of liquid confined beneath the surface of the earth in an enlarged portion of a bore hole and in pressure-responsive relationship with the walls of said enlarged portion of said bore hole, a conduit enclosing a liquid column in fluid communication with said body of liquid and extending up through said bore hole to a point above the surface of the earth and means for applying periodic stresses to said liquid column, thence to the body of liquid within said bag and thence to the walls of said bore hole.

13. Apparatus for generating seismic waves for use in seismic geophysical prospecting comprising a flexible bag disposed in a bore hole in the earth and in contact with the walls of said bore hole, a body of fluid within said bag, a conduit enclosing a fluid column in fluid communication with said body of fluid and extending up through said bore hole to a point above the surface of the earth, means for applying a superimposed static pressure to said fluid column and means for applying periodic stresses to said fluid column in addition to said superimposed static pressure.

14. Apparatus for generating seismic waves for use in seismic geophysical prospecting comprising a flexible bag disposed in a bore hole in the earth and in contact with the walls of said bore hole, a body of liquid within said bag, a conduit enclosing a liquid column in fluid communication with said body of liquid and extending up through said bore hole to a point above the surface of the earth, means for applying a superimposed static pressure to said liquid column, means for applying periodic stresses to said liquid column in addition to said superimposed static pressure and means presenting a high impedance to the flow of liquid disposed between said means for applying a superimposed static pressure and said liquid column.

15. Apparatus for generating seismic waves for use in seismic geophysical prospecting comprising a flexible bag disposed in a bore hole in the earth and in contact with the walls of said bore hole, a body of liquid within said bag, a conduit enclosing a liquid column in fluid communication with said body of liquid and extending up through said bore hole to a point above the surface of the earth, means for applying a superimposed static pressure to said liquid column and an hydraulic pump for applying periodic stresses to said liquid column in addition to said superimposed static pressure.

16. Apparatus for generating a series of seismic waves for use in seismic geophysical prospecting comprising a body of liquid confined in a cavity in the earth, said body of liquid being in pressure-responsive relationship with the walls of said cavity, a conduit enclosing a liquid-filled conduit extending from said body of liquid to a point above the surface of the earth, a piston disposed in a portion of said conduit and in communication with the liquid in said conduit, an eccentrically mounted mass supported by said piston and means for rotating said mass.

17. Apparatus for generating seismic waves at a point below the surface of the earth comprising a body of liquid confined in a portion of a bore hole, said body of liquid being in pressure responsive relationship with the walls of said portion of said bore hole, a pipe in fluid communication with said body of liquid and extending through said bore hole to a point above the surface of the earth, a liquid column in said pipe, a cylinder communicating with said pipe, a piston in said cylinder, said piston being in fluid communication with said body of liquid, a cam, means for rotating said cam and means responsive to the rotation of said cam for reciprocating said piston, whereby a desired wave can be transmitted from said cam to said responsive means, thence to said piston, thence to said liquid column, thence to said body of liquid and thence to the walls of said portion of said bore hole.

18. Apparatus for applying pressure changes to a localized portion of the earth beneath its surface and for the measurement of said changes comprising a body of fluid substantially completely confined beneath the surface of the earth in pressure responsive relationship therewith, a conduit enclosing a fluid column extending from said body of fluid to a point above the surface of the earth, said fluid column being substantially free from pressure responsive relationship with the earth above said body of fluid, means for applying varying pressures to said fluid column, a flexible diaphragm in fluid communication with said fluid column and means for measuring the movement of said flexible diaphragm.

RAYMOND T. CLOUD.